S. E. JOHANNESEN.
ELECTRICITY TRANSFORMING AND CONVERTING APPARATUS.
APPLICATION FILED MAY 16, 1917.
1,294,109.
Patented Feb. 11, 1919.
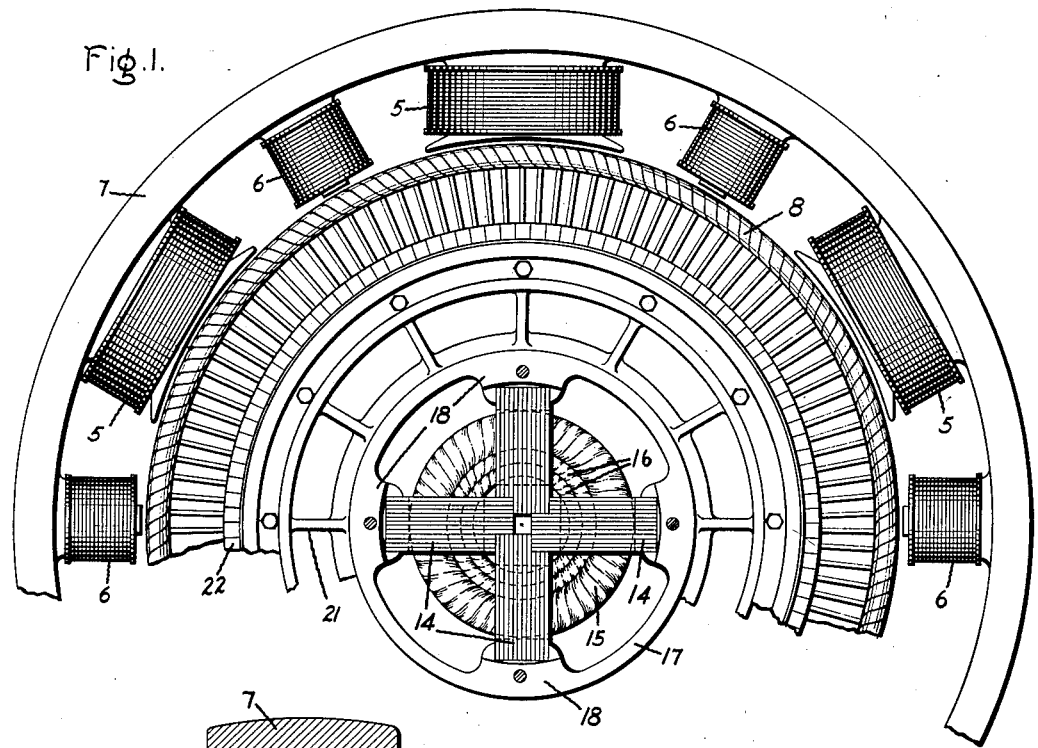
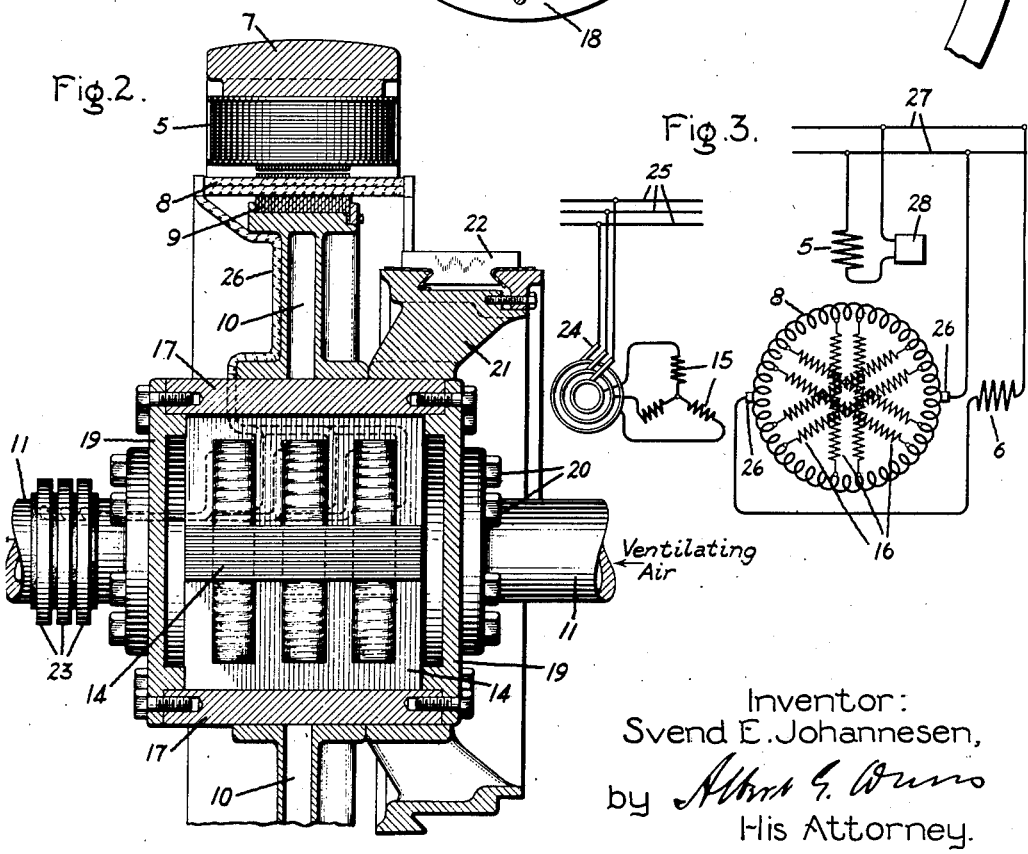
Inventor:
Svend E. Johannesen,
by *Albert G. Burns*
His Attorney.

UNITED STATES PATENT OFFICE.

SVEND E. JOHANNESEN, OF PITTSFIELD, MASSACHUSETTS, ASSIGNOR TO GENERAL ELECTRIC COMPANY, A CORPORATION OF NEW YORK.

ELECTRICITY TRANSFORMING AND CONVERTING APPARATUS.

1,294,109.   Specification of Letters Patent.   Patented Feb. 11, 1919.

Application filed May 16, 1917. Serial No. 169,100.

*To all whom it may concern:*

Be it known that I, SVEND E. JOHANNESEN, a citizen of the United States, residing at Pittsfield, county of Berkshire, State of Massachusetts, have invented certain new and useful Improvements in Electricity Transforming and Converting Apparatus, of which the following is a specification.

My invention relates to electricity transforming and converting apparatus. In their copending patent application Ser. No. 118,635, filed Sept. 6, 1916, Charles W. Stone and Henry M. Hobart describe the use of a step-down polyphase transformer mounted on the rotatable shaft of a device for converting alternating current electric energy into electric energy of a different character, such for example as a synchronous converter or rectifier. My present invention relates particularly to electricity transforming and converting apparatus of this type, and has for its prinicpal object an improved arrangement of such a transformer and electricity converting device. More particularly, the object of my present invention is to provide a compact and economical arrangement of a rotatable transformer and a synchronous converter, and to this end the invention consists in building the transformer as a part of the usual mechanical framework or spider of the rotor of the converter.

The novel features of the invention which I believe to be patentably characteristic thereof are definitely set forth in the appended claims. The invention itself and the construction and mode of operation of apparatus embodying the same will be best understood from the following description taken in conjunction with the accompanying drawings, in which:

Figure 1 is an elevation of the upper half of a transforming and converting apparatus embodying the invention; Fig. 2 is a sectional elevation of the upper half of the same apparatus; and Fig. 3 is a diagram of the electrical connections of the apparatus.

My present invention is particularly applicable to any rotating apparatus for receiving alternating current electric energy and delivering direct current electric energy, such as a synchronous converter or rectifier. In the accompanying drawings, I have illustrated my invention applied to a synchronous converter receiving electric energy in the form of polyphase alternating current from a step-down transformer and delivering electric energy in the form of direct current at its commutator. The step-down transformer in accordance with the aforementioned invention of Stone and Hobart rotates as a unit with the rotor of the converter and has a secondary winding of a greater number of phases than the main source of alternating current energy supply. In accordance with my present invention, the transformer is built into the mechanical structure of the rotor of the converter, thereby effecting an economy in space and materials.

The stationary magnetic field system of the converter comprises the usual main field spools 5 and the usual inter-pole spools 6 suitably mounted on the stator frame 7. The commutated armature winding 8 of the converter is carried in distributed slots in an annular laminated magnetic core 9. The core 9 is secured to the outer periphery of a circular supporting member or spider 10. The spider 10 is mounted on a hollow cylindrical structure to the sides of which are bolted or otherwise suitably secured the rotatably mounted shaft 11 of the converter and within which is assembled the step-down polyphase transformer.

The magnetic core of the transformer consists of four rectangular elements 14 secured together in the form of a cross, as clearly illustrated in Figs. 1 and 2 of the drawings. The transformer is designed for a three phase primary source of supply, and, accordingly, each element 14 has three winding windows. The coils 15 and 16 of the primary and secondary windings of the transformer are mounted in these windows, as shown in Figs. 1 and 2. The electrical arrangement of the transformer windings will be more fully described hereinafter.

The transformer core and assembled windings are mounted within a cylindrical shell 17. The interior wall of this shell is provided with four projections 18 in which are securely fitted the four extremities of the transformer core. The ends of the shell 17 are closed by circular plates 19 which are bolted or otherwise suitably secured to the shell. The shaft 11 of the converter is secured in any suitable manner to the circular end plates 19. In the drawings, I have shown the shaft 11 secured to the end plates 19 by means of bolts 20. It will be noted that the shaft 11 consists of two parts, one of which is bolted to one end plate 19 while the other is bolted to the other end plate. The shell 17 and plates 19 thus form a hollow but at the same time very strong and rigid drum within which the step-down transformer is mounted and on the outer periphery of which is secured the spider or framework of the rotor structure of the converter. Each member of the shaft 11 is provided with a conduit communicating with the interior of the shell 17 for the passage of a cooling fluid, such as air, to and from the interior of the shell. This provides a very convenient means for circulating air about the transformer windings and core for cooling purposes, and is one of the particular advantages resulting from my improved construction.

A second spider or frame 21 is also secured to the outer peripheral surface of the shell 17 and carries the commutator 22. The segments of this commutator are connected in the usual manner to the armature winding 8 of the converter.

Three high tension collector rings 23 are mounted on the shaft 11 and are electrically connected to the three phase primary winding 15 of the step-down transformer. Suitable brushes 24 are designed to bear on these collector rings and to be connected to the three phase source of supply 25, as diagrammatically indicated in Fig. 3. There are two secondary coils 16 for each primary coil 15 of the transformer winding, thus making six secondary coils in all. It will be seen from Fig. 1 that the primary coils surround their corresponding secondary coils. The six secondary coils are electrically arranged as indicated in Fig. 3 so that a twelve phase secondary winding is in effect produced. The twelve terminals of the secondary winding are then connected to twelve taps per pair of poles of the armature winding 8. In Fig. 3, I have represented, merely for the sake of clearness, a two-pole converter. The converter of Figs. 1 and 2 is, however, a six-pole machine, and there will, accordingly, be a total of thirty six taps between the armature winding 8 and the secondary winding 16 of the transformer. The connection 26 between the secondary winding of the transformer and the armature winding of the converter are brought out through suitable holes in the shell 17.

In Fig. 3 of the drawings, I have diagrammatically represented brushes 26 designed to bear on the commutator 22 and electrically connected to the D. C. mains 27. The interpole spools 6 are connected in series relation with the commutator brushes 26, while the main field spools 5 are connected in shunt thereto. A rheostat 28 is included in the circuit of the main spools 5.

It will of course be understood that the phase multiplication of the step-down transformer may be of any desired character, and I have merely illustrated a phase multiplication of three to twelve phases for explanatory purposes. It will furthermore be understood that the coils of the secondary winding of the transformer may be arranged in accordance with any suitable principle for obtaining the desired phase multiplication. I do not, therefore, wish to be limited to the particular type of transformer I have herein described and illustrated. I, accordingly, wish to cover in the following claims all modifications within the spirit and scope of the invention.

What I claim as new and desire to secure by Letters Patent of the United States, is:—

1. An electricity transforming and converting apparatus comprising in combination a synchronous converter having a stationary magnetic field system and a rotatable member carrying a commutated armature winding associated with said field system to form a synchronous converter, said rotatable member comprising a hollow supporting structure, a shaft rigidly secured to said structure, a magnetic core for said armature winding mounted on said structure, a polyphase transformer mounted within said structure, collector rings carried by said shaft and electrically connected to the primary winding of said transformer, and means electrically connecting the secondary winding of said transformer to said armature winding.

2. An electricity transforming and converting apparatus comprising in combination a hollow supporting structure, a rotatably mounted shaft secured to said structure, a magnetic core carried by said structure, a commutated armature winding carried by said core, a stationary magnetic field system associated with said armature winding to form a synchronous converter, and a polyphase transformer mounted within said structure and having its secondary winding electrically connected to said armature winding.

3. An electricity transforming and converting apparatus comprising in combination a cylindrical shell, circular end plates rigidly secured to said shell, a rotatably mounted shaft rigidly secured to said end plates, a spider mounted on said shell, a magnetic core carried by said spider, a stationary magnetic field system surrounding said core, an armature winding carried by said core and associated with said field system to form a synchronous converter, a commutator mounted on said shell and electrically connected to said armature winding, a polyphase transformer mounted within said shell, collector rings carried by said shaft and electrically connected to the primary winding of said transformer, and means electrically connecting the secondary winding of said transformer to said armature winding.

4. An electricity transforming and converting apparatus comprising in combination a polyphase transformer, a supporting frame for said transformer, a rotatably mounted shaft secured to said frame and formed to convey a cooling medium to and from within said frame, and means for receiving polyphase alternating current electric energy and delivering direct current electric energy mounted on said frame and electrically connected to the secondary winding of said transformer.

5. An electricity transforming and converting apparatus comprising in combination a hollow supporting structure, a polyphase transformer mounted within said structure, a rotatably mounted shaft secured to said structure, and means for receiving polyphase alternating current electric energy and delivering direct current electric energy mounted on the outside of said structure and electrically connected to the secondary winding of said transformer.

6. An electricity transforming and converting apparatus comprising in combination a hollow supporting structure, a rotatably mounted shaft secured to said structure, a supporting frame mounted on said structure, a laminated magnetic core carried by said frame, a stationary magnetic field system surrounding said core, a commutated armature winding carried by said core and forming with said field system a synchronous converter, a polyphase transformer mounted within said structure and having its secondary winding electrically connected to said armature winding, and collector rings carried by said shaft and electrically connected to the primary winding of said transformer.

7. An electricity transforming and converting apparatus comprising in combination a hollow supporting structure, a polyphase transformer mounted within said structure, a rotatably mounted shaft secured to said structure, said shaft having a conduit communicating with the interior of said structure so that a fluid may be circulated through said structure for cooling said transformer windings, and means for receiving polyphase alternating current electric energy and delivering direct current electric energy mounted on the outside of said structure and electrically connected to the secondary winding of said transformer.

8. An electricity transforming and converting apparatus comprising in combination a substantially inclosed supporting member, a polyphase transformer mounted within said member, a rotatably mounted shaft secured to said member, said shaft having a conduit for the passage of a cooling fluid to and from the interior of said member, a commutated armature winding carried by said member and electrically connected to the secondary winding of said transformer, and a stationary magnetic field system associated with said armature winding to form a synchronous converter.

9. An electricity transforming and converting apparatus comprising in combination a synchronous converter having a stationary magnetic field system and a rotatable member carrying a commutated armature winding, said rotatable member including a mechanical supporting structure and an armature winding electrically associated with said field system, a transformer built into said mechanical supporting structure, collector rings associated with said member and electrically connected to the primary winding of said transformer, and means electrically connecting the secondary winding of said transformer to said armature winding.

In witness whereof, I have hereunto set my hand this tenth day of May, 1917.

SVEND E. JOHANNESEN.